United States Patent
Morioka et al.

(10) Patent No.: US 11,628,564 B2
(45) Date of Patent: Apr. 18, 2023

(54) ROBOT CONTROL DEVICE AND ROBOT PROGRAMMING DEVICE

(71) Applicant: Fanuc Corporation, Yamanashi (JP)

(72) Inventors: Masahiro Morioka, Yamanashi (JP); Takashi Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 192 days.

(21) Appl. No.: 16/853,138

(22) Filed: Apr. 20, 2020

(65) Prior Publication Data

US 2020/0398426 A1    Dec. 24, 2020

(30) Foreign Application Priority Data

Jun. 21, 2019  (JP) .............................. JP2019-115156

(51) Int. Cl.
*B25J 9/16*    (2006.01)
*B25J 19/02*   (2006.01)
*B25J 13/08*   (2006.01)

(52) U.S. Cl.
CPC .......... *B25J 9/1633* (2013.01); *B25J 9/1674* (2013.01); *B25J 9/1694* (2013.01); *B25J 13/085* (2013.01); *B25J 19/02* (2013.01)

(58) Field of Classification Search
CPC ...... B25J 9/1633; B25J 9/1674; B25J 9/1694; B25J 13/085; B25J 19/02; B25J 9/161; B25J 9/1671; B25J 9/1638; G05B 2219/40454; G01P 21/00; G01P 15/18
See application file for complete search history.

(56) References Cited

U.S. PATENT DOCUMENTS

| | | | |
|---|---|---|---|
| 5,130,632 A * | 7/1992 | Ezawa | B25J 9/1633 318/568.11 |
| 2011/0093120 A1 | 4/2011 | Ando et al. | |
| 2014/0081460 A1 | 3/2014 | Ando et al. | |
| 2016/0031086 A1* | 2/2016 | Tanabe | B25J 5/007 901/50 |
| 2016/0089790 A1* | 3/2016 | Wang | B25J 9/1676 700/255 |
| 2016/0221193 A1* | 8/2016 | Sato | B25J 9/1674 |
| 2018/0016119 A1 | 1/2018 | Iura | |
| 2018/0200881 A1* | 7/2018 | Ishii | B25J 19/06 |

(Continued)

FOREIGN PATENT DOCUMENTS

| | | |
|---|---|---|
| EP | 2314426 A2 | 4/2011 |
| JP | H05-261691 A | 10/1993 |

(Continued)

*Primary Examiner* — Abby Y Lin
*Assistant Examiner* — Dylan M Katz
(74) *Attorney, Agent, or Firm* — Shackelford, Bowen, McKinley & Norton, LLP

(57) ABSTRACT

A control device for a robot includes a comparing unit and a controller. When the robot equipped with a force sensor capable of detecting force components of a same type in a plurality of directions operates, the comparing unit compares a magnitude of each of the force components detected by the force sensor with a predetermined threshold value for each of the directions. If the comparing unit determines that a magnitude of a force component in any of the directions exceeds the threshold value, the controller controls the robot to avoid an increase in the magnitude of the force component in the direction.

9 Claims, 4 Drawing Sheets

(56) References Cited

U.S. PATENT DOCUMENTS

| | | | | |
|---|---|---|---|---|
| 2018/0210434 A1* | 7/2018 | Iwatake | ................ | B25J 13/085 |
| 2019/0059866 A1* | 2/2019 | Shelton, IV | ....... | A61B 17/1285 |
| 2020/0030992 A1* | 1/2020 | Motoyoshi | ............ | B25J 13/085 |
| 2020/0206893 A1* | 7/2020 | Shimomura | ........... | B25J 9/1694 |
| 2020/0324408 A1* | 10/2020 | Bourlion | ................ | A61B 90/06 |

FOREIGN PATENT DOCUMENTS

| | | | |
|---|---|---|---|
| JP | 2011-088225 A | | 5/2011 |
| JP | 2011235423 A | | 11/2011 |
| JP | 2012-137421 A | | 7/2012 |
| JP | 2013-094928 A | | 5/2013 |
| JP | 2016002642 A | * | 1/2016 |
| JP | 2018-008338 A | | 1/2018 |

* cited by examiner

ROBOT CONTROL DEVICE AND ROBOT PROGRAMMING DEVICE

CROSS-REFERENCE TO RELATED APPLICATIONS

This application is based on Japanese Patent Application No. 2019-115156, the content of which is incorporated herein by reference.

TECHNICAL FIELD

The present disclosure relates to robot control devices and robot programming devices.

BACKGROUND ART

A known robot is equipped with a force sensor capable of detecting forces in a plurality of directions (e.g., see Patent Literature 1).

CITATION LIST

Patent Literature

{PTL 1}
Japanese Unexamined Patent Application, Publication No. 2012-137421

SUMMARY OF INVENTION

An aspect of the present disclosure provides a robot control device including a comparing unit and a controller. When a robot equipped with a force sensor capable of detecting force components of a same type in a plurality of directions operates, the comparing unit compares a magnitude of each of the force components detected by the force sensor with a predetermined threshold value for each of the directions. If the comparing unit determines that a magnitude of a force component in any of the directions exceeds the threshold value, the controller controls the robot to avoid an increase in the magnitude of the force component in the direction.

DESCRIPTION OF EMBODIMENTS

A robot control device 1 and a robot programming device 10 according to an embodiment of the present disclosure will be described below with reference to the drawings.

Figure 1:
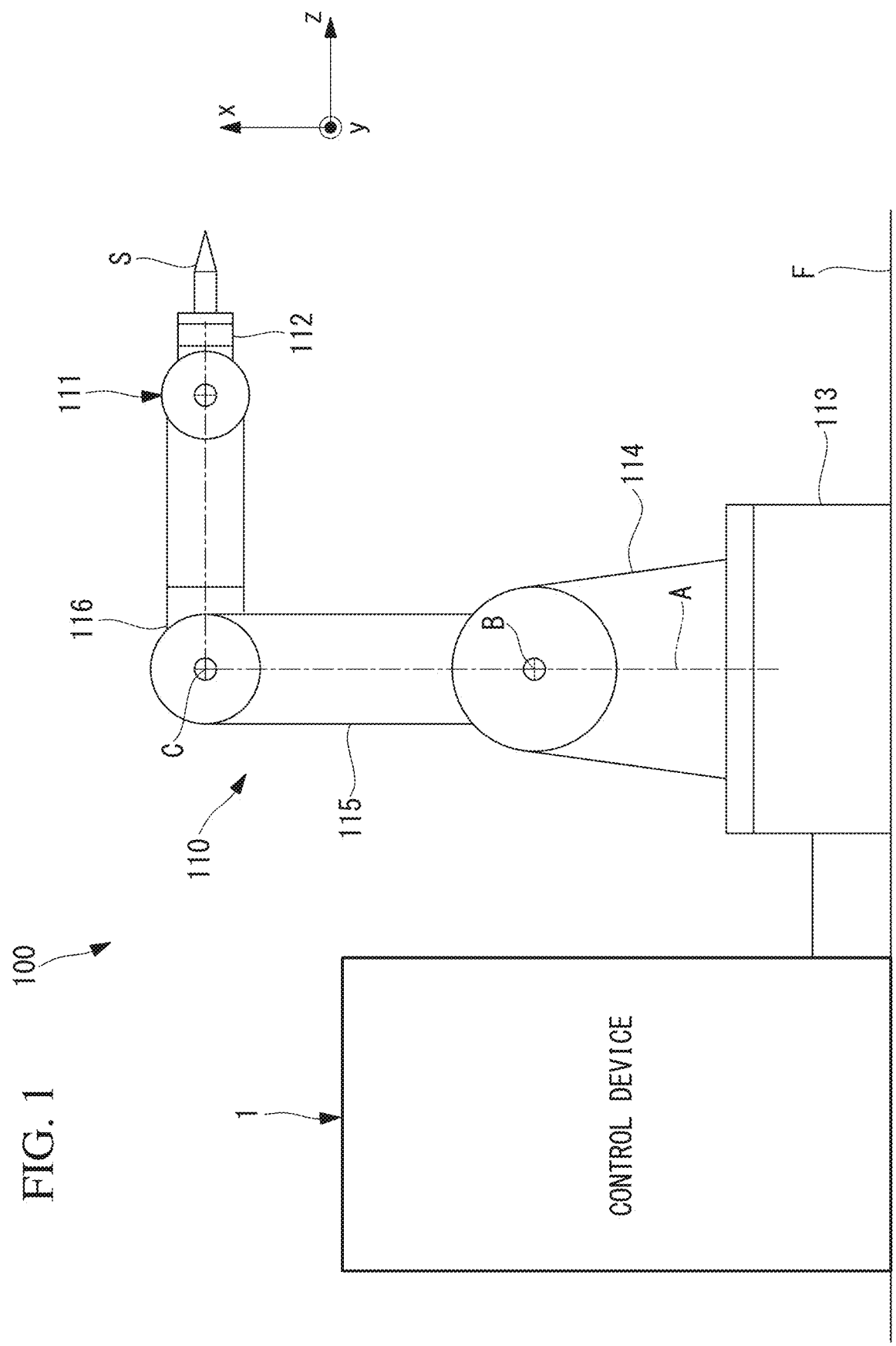
FIG. 1 illustrates the overall configuration of a robot system including a control device according to an embodiment of the present disclosure.

The control device 1 according to this embodiment is provided in a robot system 100 shown in FIG. 1.

The robot system 100 includes a robot 110 and the control device 1 according to this embodiment.

The robot 110 is a six-axis vertical articulated robot, or may be of a freely-chosen type, such as a vertical articulated robot of a type other than a six-axis type or a horizontal articulated robot.

The robot 110 includes a base 113 set on a floor surface F, a rotating body (link) 114 rotatable relative to the base 113 around a first axis A, a first arm (link) 115 rotatable relative to the rotating body 114 around a horizontal second axis B orthogonal to the first axis A, a second arm (link) 116 rotatable relative to the first arm 115 around a third axis C parallel to the second axis B, and a wrist (link) 111 rotatable relative to the second arm 116. The distal end of the wrist 111 has a tool S attached thereto.

Figure 2:
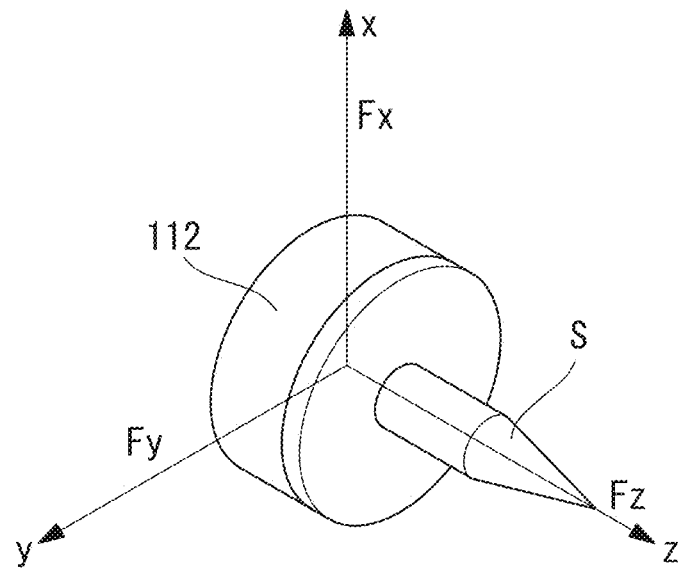
FIG. 2 is a perspective view schematically illustrating a force sensor and a tool that are attached to the distal end of a wrist of a robot included in the robot system in FIG. 1, as well as the axial directions of the force sensor and the tool.

The robot 110 also includes a three-axis force sensor 112 between the distal end surface of the wrist 111 and the tool S. The force sensor 112 can detect three force components Fx, Fy, and Fz acting on the tool S along three axes x, y, and z. As shown in FIG. 2, the three axes z, x, and y are respectively aligned with a direction z extending from the center of the wrist 111 toward the distal end of the tool S and two directions x and y extending orthogonally to the direction z and orthogonally to each other.

Figure 3:
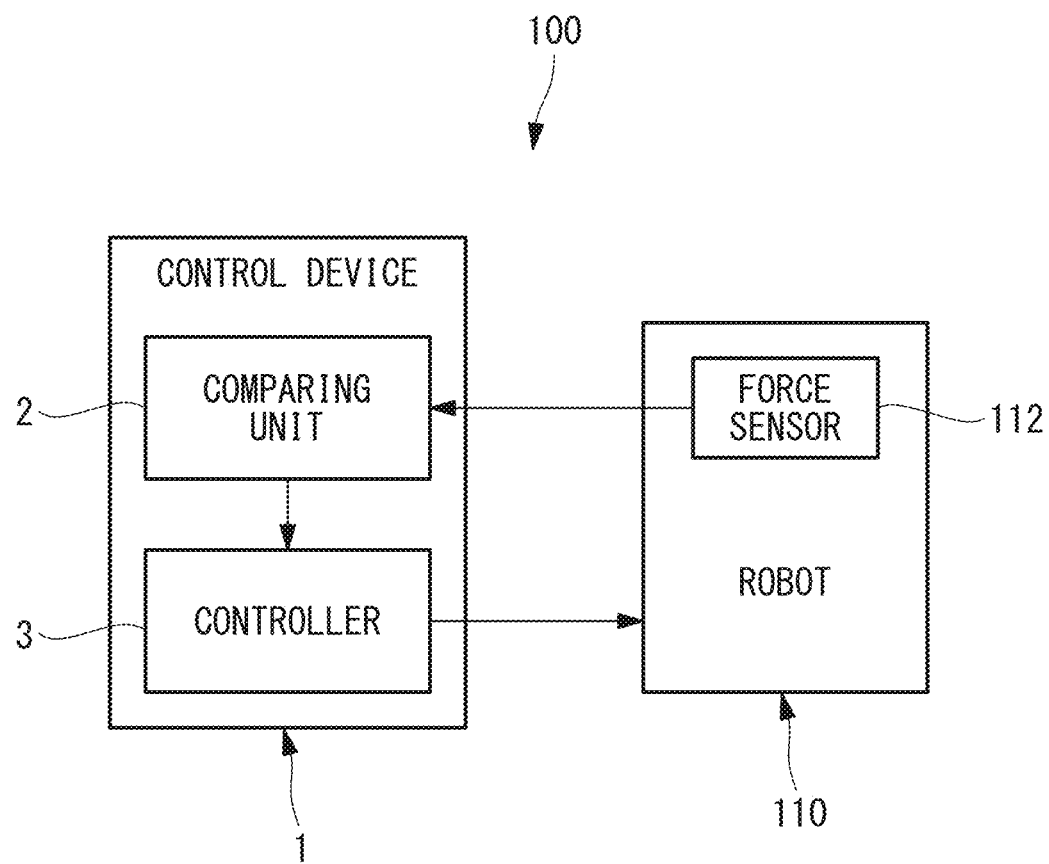
FIG. 3 is a block diagram illustrating a control device in FIG. 1.

As shown in FIG. 3, the control device 1 includes a comparing unit 2 that receives the three force components Fx, Fy, and Fz detected by the force sensor 112 and that compares the magnitude (absolute value) of each of the force components Fx, Fy, and Fz with a corresponding threshold value. The control device 1 also includes a controller 3.

The controller 3 causes the robot 110 to operate in accordance with a preliminarily learned operation program and reduces the operating speed of the robot 110 if the magnitude of any of the force components Fx, Fy, and Fz exceeds the corresponding threshold value as a result of the comparison by the comparing unit 2. The threshold values are set to values lower than or equal to rated loads in the three directions x, y, and z in which the force sensor 112 is capable of detecting the force components Fx, Fy, and Fz.

In the control device 1 according to this embodiment having the above-described configuration, when the robot 110 is operating in accordance with the operation program, the force components Fx, Fy, and Fz in the three orthogonal directions x, y, and z are detected by the force sensor 112, and are compared with the threshold values for the respective directions x, y, and z by the comparing unit 2. As a result, if a force component in any one of the directions exceeds the corresponding threshold value, the controller 3 reduces the operating speed of the robot 110, so that the force component in the direction in which the corresponding threshold value has been exceeded is prevented from increasing any further.

For example, in a case where a precision fitting or polishing process is to be performed in accordance with force control using the force sensor 112, the force sensor to be used needs to have high detection performance. In this case, a compact force sensor with a rated load lower than or equal to the rated load of the robot 110 is sometimes installed. Even in such a case, threshold values are set for the directions x, y, and z in which the force sensor 112 is capable of detecting the force components, and the operating speed of the robot 110 is reduced if any of the force components Fx, Fy, and Fz in the directions x, y, and z exceeds the corresponding threshold value. Consequently, the force components Fx, Fy, and Fz in the directions x, y, and z are prevented from exceeding the rated load of the force sensor 112. This is advantageous in that the force sensor 112 can be maintained in a sound state.

Specifically, the control device 1 for the robot 110 according to this embodiment is advantageous in that the force sensor 112 installed in the robot 110 can be reduced in size and is made to have high precision, while the soundness of the force sensor 112 can be maintained.

If the actual force acting on the tool S is to be detected, a combined force may be calculated by combining the force components Fx, Fy, and Fz.

In this embodiment, the exemplified control device 1 prevents a failure of the force sensor 112 even if the force sensor 112 is reduced in size. Alternatively, the force sensor 112 used may have a sufficient rated load, and values lower than or equal to the rated loads of the tool S in the directions x, y, and z may be set as threshold values. Accordingly, if the tool S has different rated loads in the directions x, y, and z, a force applied to the tool S in any of the directions x, y, and z is prevented from exceeding the corresponding rated load of the tool S, whereby the soundness of the tool S can be maintained.

Figure 4:
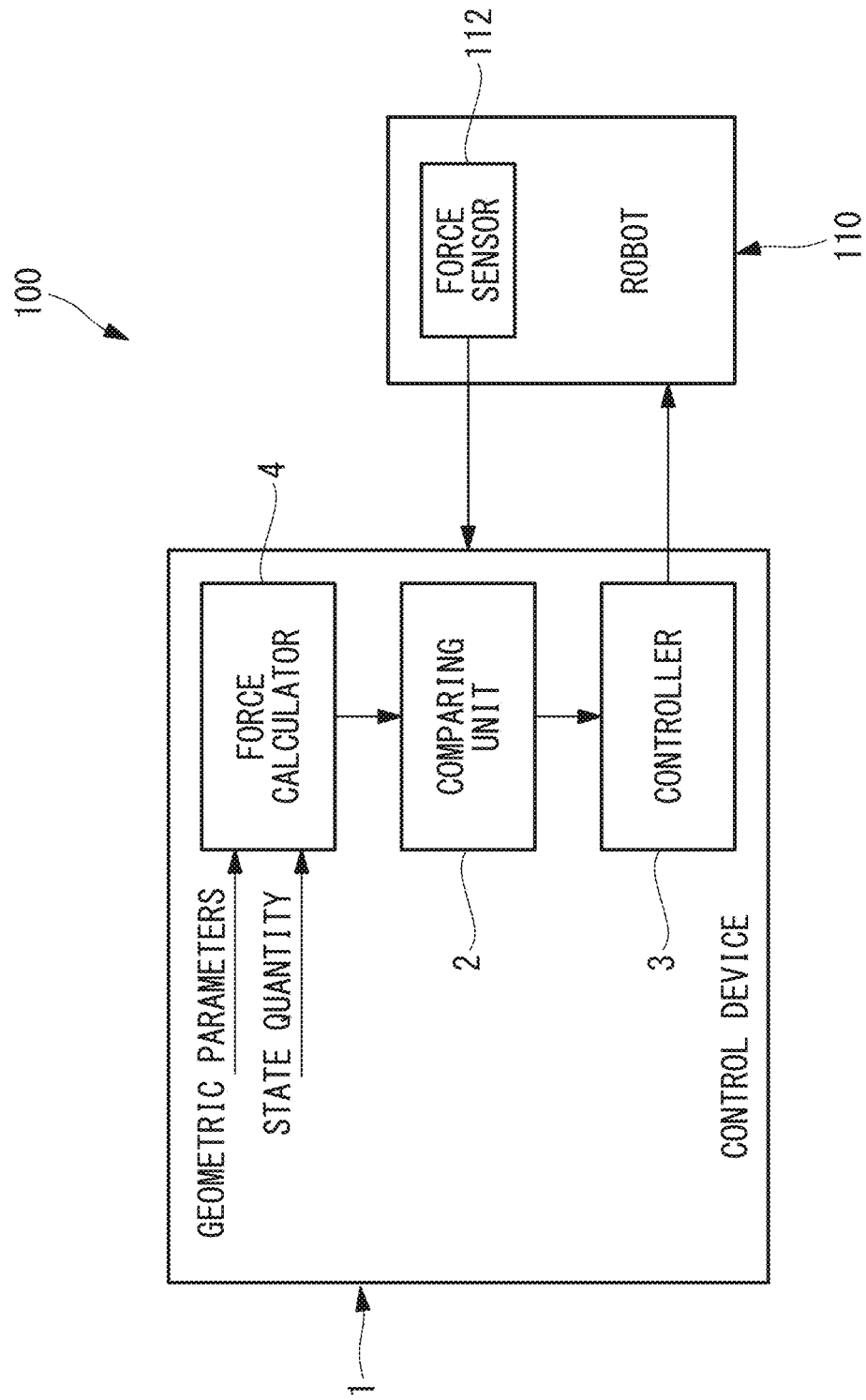
FIG. 4 is a block diagram illustrating a modification of the control device in FIG. 1.

In this embodiment, it is determined whether or not the force components Fx, Fy, and Fz actually detected by the force sensor 112 have exceeded the respective threshold values for the directions x, y, and z. Alternatively, as shown in FIG. 4, the control device 1 may include a force calculator 4 that calculates the magnitude of each of the force components Fx, Fy, and Fz detected by the force sensor 112 based on a geometric parameter of the robot 110 and a state quantity of the robot 110.

In this case, the comparing unit 2 may compare the force components Fx, Fy, and Fz calculated by the force calculator 4 with the threshold values.

The geometric parameter includes, for example, the mass and the link length of each of the links 114, 115, and 116 of the robot 110.

Furthermore, the state quantity includes the angle of each axis of the robot 110, the operating speed thereof, and the acceleration thereof.

Accordingly, the force calculator 4 can calculate the force components Fx, Fy, and Fz in view of the effect of gravity and dynamics, and can preliminarily predict whether or not the magnitude of the force component Fx, Fy, or Fz exceeds the corresponding threshold value and at which point of the operation program. Therefore, the operating speed can be reduced before the magnitude of the force component Fx, Fy, or Fz exceeds the corresponding threshold value. In this case, the threshold values may be set to values equal to the rated loads of the force sensor 112 in the directions x, y, and z.

Furthermore, the estimation of the force components Fx, Fy, and Fz by the force calculator 4 and the detection of the force components Fx, Fy, and Fz by the force sensor 112 may be performed concurrently. The operating speed of the robot 110 is reduced even when the force components do not exceed the threshold values in the estimation by the force calculator 4, but the actual force components Fx, Fy, and Fz exceed the threshold values. This is advantageous in that the soundness of the force sensor 112 can be maintained.

As an alternative to this embodiment in which the force sensor 112 detects the force components Fx, Fy, and Fz in the three orthogonal directions x, y, and z, the force sensor 112 may detect torques around axes extending in the three directions x, y, and z, or may detect the force component Fz in the direction z and torques around the axes extending in the directions y and z. As another alternative, the force sensor 112 may detect a torque around the axis extending in the direction z and the force components Fy and Fz in the directions y and z.

Moreover, the directions of detection by the force sensor 112 do not necessarily have to be orthogonal to one another.

In this embodiment, if the magnitude of any of the force components Fx, Fy, and Fz in the directions x, y, and z exceeds the corresponding threshold value, the controller 3 reduces the operating speed of the robot 110. Alternatively, in order to avoid a further increase in the magnitude of the force component Fx, Fy, or Fz in the direction x, y, or z in which the threshold value has been exceeded, the robot 110 may be stopped, or the robot 110 may operate along a reverse path after stopping.

As an alternative to this embodiment in which the force sensor 112 is attached to the distal end of the wrist 111, the invention may be applied to a case where the force sensor 112 is attached to another freely-chosen location.

In the control device 1 according to this embodiment, the force components Fx, Fy, and Fz obtained by the force sensor 112 or the force calculator 4 are compared with the threshold values in real time, and the robot 110 is controlled by the controller 3. Alternatively, as shown in FIG. 5, the invention may be applied to the programming device 10 that causes the operation program to operate off-line.

Figure 5:
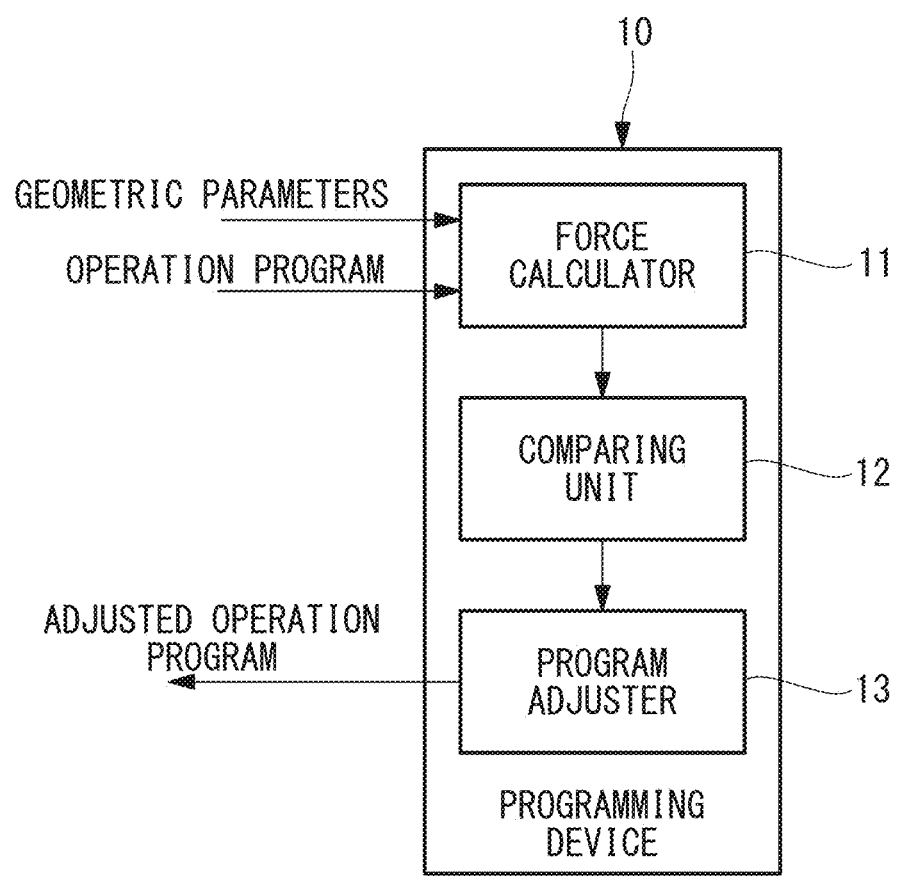
FIG. 5 is a block diagram illustrating a programming device according to an embodiment of the present disclosure.

Specifically, as shown in FIG. 5, the programming device 10 includes a force calculator 11 that calculates the force components Fx, Fy, and Fz in the three directions x, y, and z at each point in the operation program, and a comparing unit 12 that compares the magnitude of each of the calculated force components Fx, Fy, and Fz with a corresponding threshold value for each of the directions x, y, and z. The programming device 10 also includes a program adjuster 13 that changes the operation program if the comparing unit 12 determines that the magnitude of any of the force components Fx, Fy, and Fz in the directions x, y, and z has exceeded the corresponding threshold value, such that the force component Fx, Fy, or Fz is set to be smaller than or equal to the threshold value.

Accordingly, even in a case where the force sensor 112 installed is a compact force sensor having a rated load lower than the rated load of the robot 110, the operation program is simply caused to operate off-line, whereby the operation program can be adjusted so as to not apply an excessive load to the force sensor 112.

If the specifications of the force sensor 112 are not set in advance, a maximum value may be determined for the magnitude of each of the force components Fx, Fy, and Fz in the three directions x, y, and z calculated by the force calculator 11 at each point in the operation program. Accordingly, an appropriately sized force sensor 112 having a rated load higher than the maximum values for the force components Fx, Fy, and Fz can be selected.

The threshold values to be compared with the estimated values or the detected values Fx, Fy, and Fz of the force sensor 112 may each be the withstand load of the force sensor 112 normally set to be larger than the rated load, instead of the rated load of the force sensor 112. By comparing each of the force components Fx, Fy, and Fz with the withstand load of the force sensor 112, a failure of the force sensor 112 can be prevented more reliably.

Alternatively, the threshold values to be compared with the force components Fx, Fy, and Fz may be both the rated load and the withstand load of the force sensor 112. Specifically, the robot operation may be provided with a first restriction if a force component exceeds the rated load serving as a first threshold value, and the robot operation may be provided with a second restriction if a force component exceeds the withstand load serving as a second threshold value. In detail, if it is determined that a force component exceeds the rated load, the operating speed of the robot 110 is reduced, as the first restriction. If it is determined that a force component exceeds the withstand load, the operation of the robot 110 may be stopped, as the second restriction. By restricting the robot operation in a two-stage fashion, a failure of the force sensor 112 can be prevented more reliably.

When the robot 110 is to be reduced in speed, stopped, or caused to operate along a reverse path to reduce the force acting on the force sensor 112 based on the comparison result between each of the force components Fx, Fy, and Fz and the rated load and the withstand load, an excessive force may further act on the force sensor 112 due to, for example, an inertia force acting on the robot 110 during deceleration, normally until the robot 110 completes the operation. Therefore, by estimating the excessive force in advance and limiting the acceleration and deceleration of the robot 110 to reduce the magnitude (absolute value) of each of the force components Fx, Fy, and Fz relative to the rated load and the withstand load, the force sensor 112 can be maintained in a sound state more reliably.

Furthermore, in an application that uses the force sensor 112, it is often the case that the robot 110 is pressed outward and the robot 110 is controlled to keep the pressing force constant. In this case, the force sensor 112 receives this pressing force in addition to the calculated force calculated from the geometric parameter and the state quantity of the robot 110. Since the magnitude of this pressing force can be preliminarily set for each of the directions x, y, and z in accordance with the application, if each of the calculated force components Fx, Fy, and Fz of the force sensor 112 and the corresponding threshold value are to be compared, a value obtained by subtracting a predetermined pressing force from the rated load and the withstand load of the force sensor 112 may be set as the threshold value, so that the comparison and determination processes can be performed more appropriately for each application.

REFERENCE SIGNS LIST 1 control device
2, 12 comparing unit
3 controller
4, 11 force calculator
10 programming device
13 program adjuster
110 robot
111 wrist
112 force sensor
114 rotating body (link)
115 first arm (link)
116 second arm (link)
S tool
x, y, z directions
Fx, Fy, Fz force components

The invention claimed is:

1. A robot control device comprising:
one or more processors comprising hardware, the one or more processors being configured to:
compare a magnitude of each of force components detected by a force sensor with a predetermined threshold value for each of the directions when a robot equipped with the force sensor capable of detecting the force components of a same type in a plurality of directions operates; and
in response to determining that a magnitude of a force component in any of the directions exceeds the threshold value, control the robot to avoid an increase in the magnitude of the force component in the direction;
wherein the threshold value includes a first threshold value that represents a rated value of the force sensor and a second threshold value that represents a withstand load of the force sensor;
wherein the second threshold value is larger than the first threshold value;
wherein, in response to the magnitude of any of the force components exceeding the first threshold value, the controlling of the robot reduces an operation speed of the robot;
wherein, in response to the magnitude of any of the force components exceeding the second threshold value, the controlling of the robot stops the operation of the robot and operates the robot along a reverse path after stopping; and
when the robot is to be reduced in speed, stopped, or operated along the reverse path, the controlling of the robot further controls acceleration and deceleration of the robot so as to reduce the magnitude of each of the force components relative to a rated load and a withstand load.

2. The robot control device according to claim 1, wherein:
the one or more processors are further configured to calculate the magnitude of each of the force components detected by the force sensor based on a geometric parameter of the robot and a state quantity of the robot; and
the comparing of the magnitude with the threshold value compares the magnitude of each of the calculated force components with the threshold value.

3. The robot control device according to claim 1, wherein the comparing of the magnitude with the threshold value compares the magnitude of each of the force components detected by the force sensor with the threshold value.

4. The robot control device according to claim 1, wherein the force sensor is provided at a distal end of a wrist of the robot.

5. The robot control device according to claim 2, wherein the geometric parameter includes a mass and a length of each link of the robot.

6. The robot control device according to claim 1, wherein each of the force components detected by the force sensor is a force along a predetermined axis or a torque around the axis.

7. The robot control device according to claim 1, wherein the threshold value is set to be lower than or equal to a rated value of the force sensor for each of the directions.

8. The robot control device according to claim 1, wherein the threshold value is set to be lower than or equal to a rated value of a tool attached to the robot for each of the directions.

9. The robot control device according to claim 1, wherein:
if the robot is pressed outward by a predetermined pressing force, the one or more processors are further configured to calculate the magnitude of each of the force components detected by the force sensor based on a geometric parameter of the robot, a state quantity of the robot, and the pressing force; and the comparing of the magnitude with the threshold value compares the magnitude of each of the calculated force components with the threshold value.

\* \* \* \* \*